United States Patent

[11] 3,581,485

[72] Inventor Horace E. McKibben
 Grand Junction, Mich.
[21] Appl. No. 754,905
[22] Filed Aug. 23, 1968
[45] Patented June 1, 1971
[73] Assignee Blueberry Equipment, Inc.
 South Haven, Mich.

[54] VIBRATORY HARVESTER WITH ALTERNATELY ACTUATED VIBRATORY FINGERS
 8 Claims, 7 Drawing Figs.

[52] U.S. Cl. .................................................. 56/330
[51] Int. Cl. .................................................. A01g 19/00
[50] Field of Search .................................. 56/330, 331, 328, 45, 46

[56] References Cited
 UNITED STATES PATENTS

| | | | |
|---|---|---|---|
| 2,484,319 | 10/1949 | Sperry | 56/46 |
| 3,129,551 | 4/1964 | Lasswell, Jr. | 56/328 |
| 3,241,302 | 3/1966 | Barry | 56/25.4 |
| 3,396,521 | 8/1968 | McKibben et al. | 56/330 |
| 3,478,501 | 11/1969 | Patzlaff | 56/330 |

Primary Examiner—Russell R. Kinsey
Attorney—Austin A. Webb

ABSTRACT: A row-straddling carriage has sets of individually vibrated fingers mounted on each side. Each set is reciprocable horizontally to penetrate into the crop and is slidable longitudinally of the carriage, against a spring load to remain in contact with the crop as the carriage advances. A system of hydraulic controls effects alternate advance of adjacent and opposed sets of fingers so that each set penetrates the crop while the carriage advances a short distance.

PATENTED JUN 1 1971
3,581,485
SHEET 1 OF 3
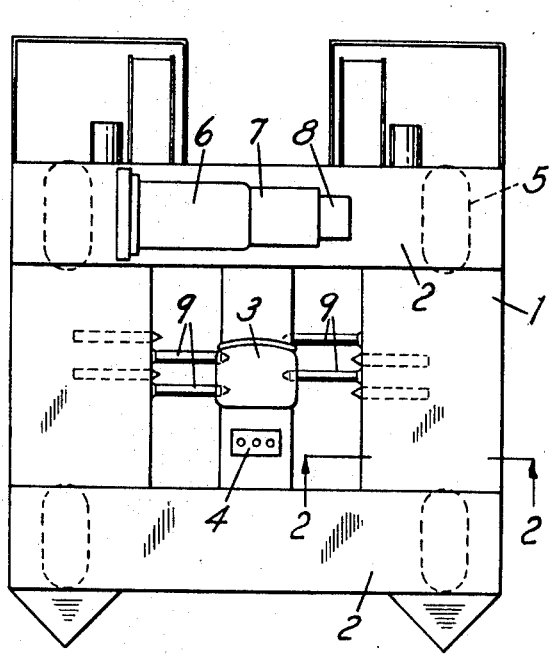
Fig. 1.
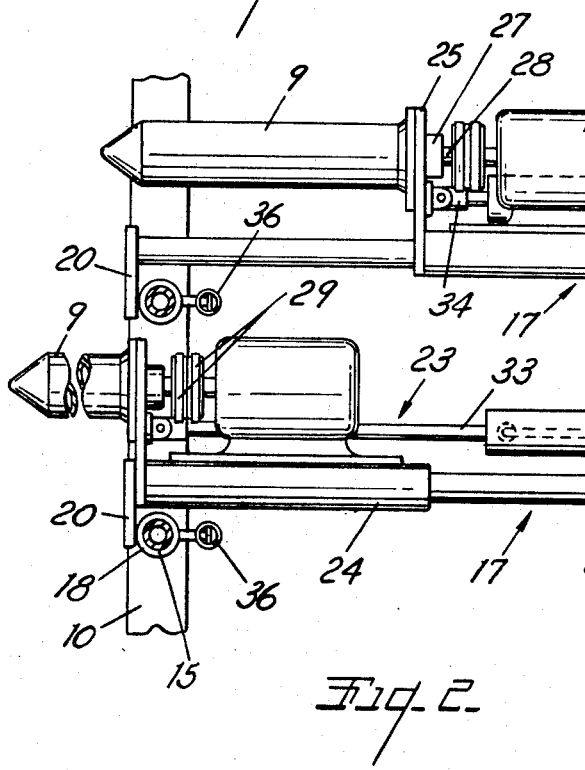
Fig. 2.
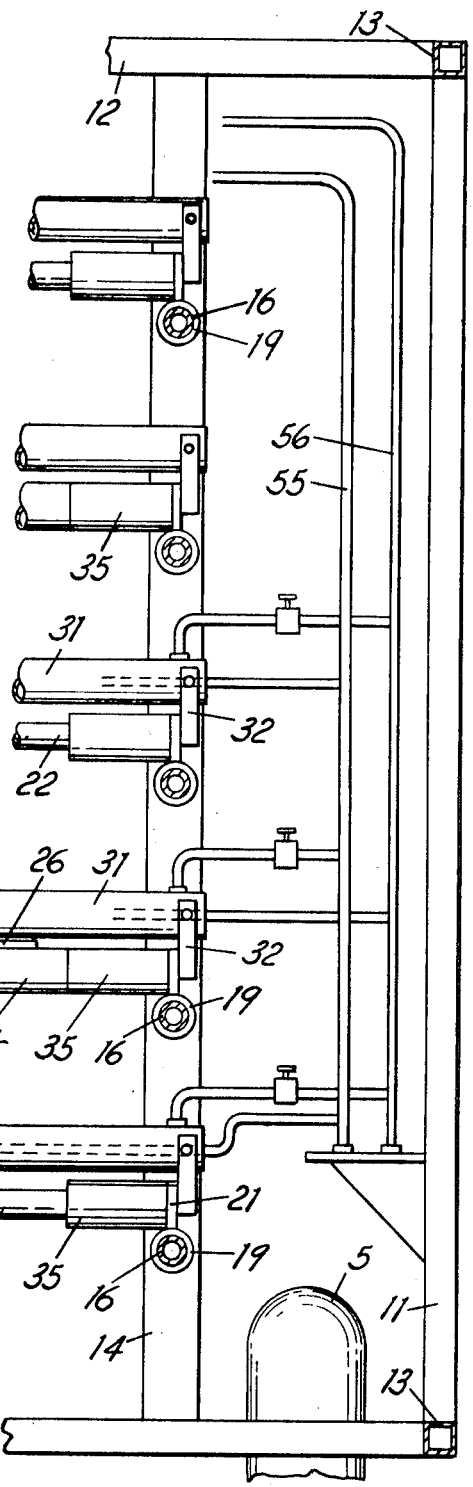
INVENTOR.
Horace E McKibben
BY
Austin A. Webb
ATTORNEY.

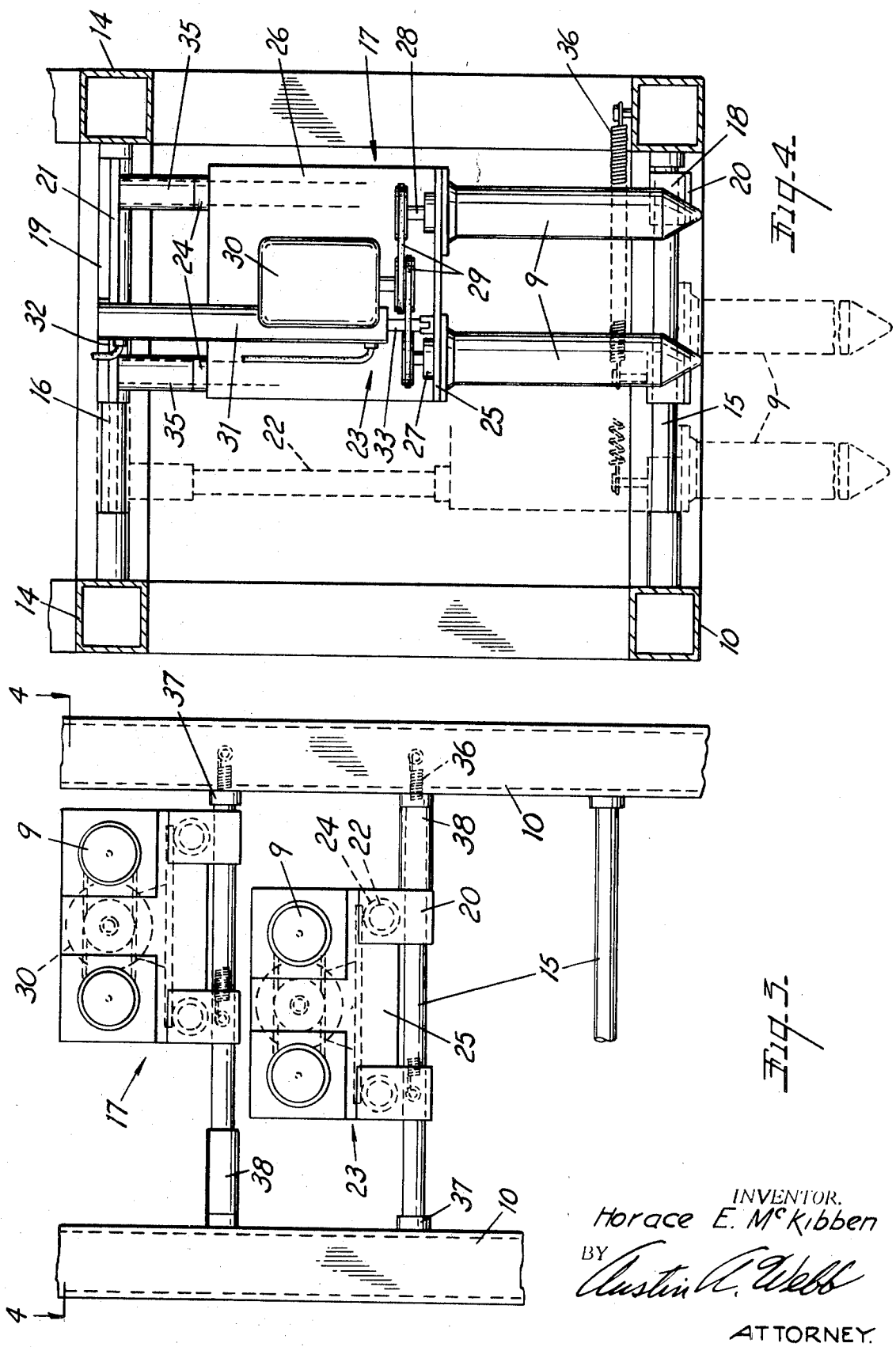

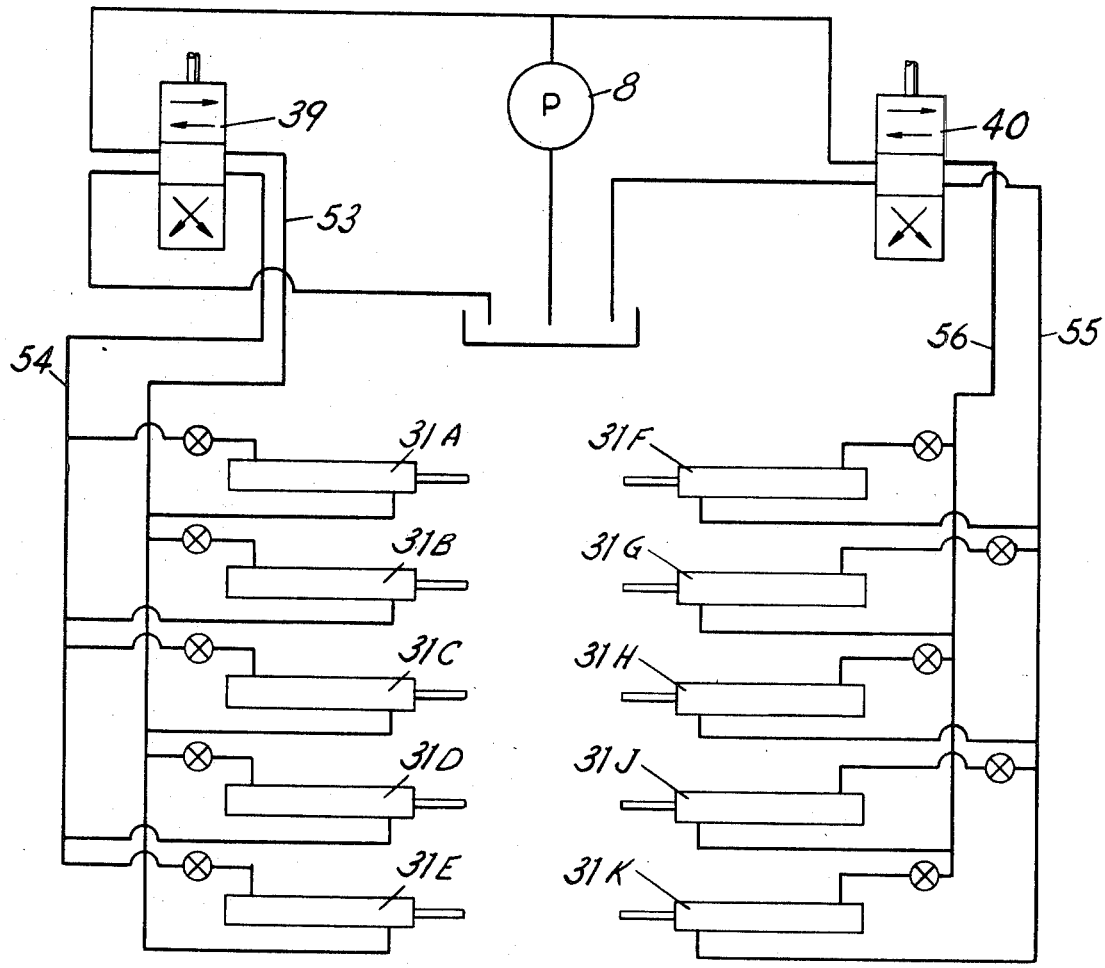
Fig. 5.
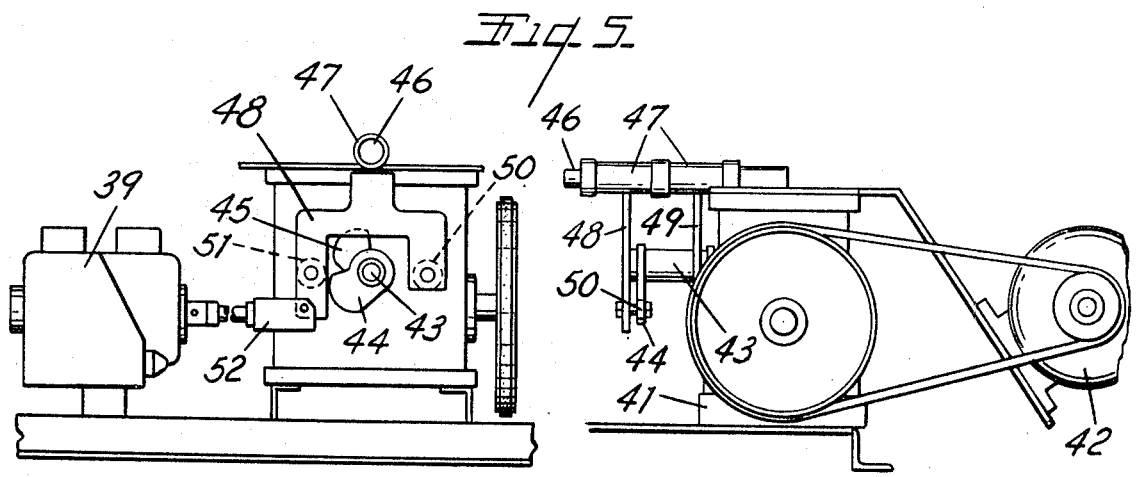
Fig. 7.
Fig. 6.
INVENTOR.
Horace E. McKibben
BY
Austin A. Webb
ATTORNEY.

VIBRATORY HARVESTER WITH ALTERNATELY ACTUATED VIBRATORY FINGERS

OUTLINE OF INVENTION

The invention provides intermittent penetration of vibratory fingers into the plant or bush of the crop being harvested. The fingers move relative to the carriage to maintain contact with the crop without tearing the bush as the machine advances. Opposed fingers and vertically spaced fingers are actuated in timed sequence to maintain vibratory contact with the bush as the machine advances and as the alternate fingers are retracted at the end of their travel relative to the longitudinal advance of the machine.

FIG. 1 is a top plan view of a harvester with the vibrator member mounting of the invention thereon.

FIG. 2 is a fragmentary, enlarged vertical cross-sectional view taken along the plane of the line 2-2 in FIG. 1.

FIG. 3 is a fragmentary elevational view of the inner ends of the vibrator members on one side of the machine, and the support for the members.

FIG. 4 is a fragmentary horizontal cross-sectional view of the vibrators and supports taken along the plane of the line 4-4 in FIG. 3.

FIG. 5 is a schematic diagram showing the hydraulic system for reciprocating the vibrating members.

FIG. 6 is an end elevational view of the valve operator for controlling the sequence of operation of the vibrators.

FIG. 7 is a side elevational view of the valve operator associated with the valves of the hydraulic system.

As appears generally in FIG. 1, the harvester consists of a row-straddling carriage having two upright side frames 1 connected by crossmembers 2 at the top. An operator's seat 3 is supported behind a control panel 4. The carriage has wheels 5, and an engine 6 driving an electric generator 7 and a hydraulic pump 8 for actuating the several components of the harvester. No attempt is made to show all of the drive connections or crop-collecting elements as such parts are generally old and form no part of the invention. A plurality of crop-shaking or vibrating fingers 9 are mounted on each side of the harvester to reciprocate horizontally into and out of the crop row between the two side frames. The fingers and their mountings on each side of the carriage are the same, so a description of one side will be sufficient to an understanding of the structure.

As appears more clearly in FIG. 2, 3, and 4, each side frame of the carriage includes longitudinally spaced inner uprights 10 and outer uprights 11, connected by horizontal crossbars 12 and longitudinal frame members 13. Intermediate uprights 14 are connected to the crossbars 12. Pairs of longitudinally extending tubes 15 and 16 connected between the inner uprights 10 and intermediate uprights respectively form a plurality of vertically spaced horizontally extending slideways. Five slideways are shown in the example illustrated. The slideways support vibrator frames generally indicated at 17 for sliding longitudinally of the carriage.

Each frame 17 consists of front sleeves 18 which are slidable on one of the tubes 15, and a rear sleeve 19 slidable on one of the tubes 16. Upright plates 20 are welded to the sleeves 18 and plates 21 are welded to the sleeves 19. Extending transversely of the machine between the plates 20 and 21 are spaced rods 22 of circular cross section, which form a transverse slideway on each frame.

Each transverse slideway supports a vibrator support indicated generally at 23. The support consists of two tubes 24 slidable on the rods 22, and connected at their front or inner ends by a faceplate 25. A platform 26 connects the tops of the tubes 24. The faceplate 25 carries bearings 27 that rotatably support the shafts 28 of the vibratory fingers 9 which project transversely inwardly from the faceplate. The fingers and their mounting are vibratorily driven by belts 29 driven by a motor 30 on each platform. Desirably, the fingers are driven at high speed in an orbital path, in the manner disclosed and described more fully in my copending application, Ser. No. 696,198, filed Jan. 8, 1968, now U.S. Pat. No. 3,482,383.

The vibrator supports 23 are reciprocated on the rods 22 by hydraulic cylinders 31, each having their rear or outer end connected by a bracket 32 to the plate 21 of its associated frame 17. The extensible piston rod 33 of the cylinder extends alongside of the motor 30 and is connected to a clevis 34 on the faceplate 25. The transverse stroke of the vibrator support and the fingers 9 carried thereby is of the order of 17 inches in the example illustrated. Spacer sleeves 35 on the rods 22 limit the retracting motion of the fingers.

The frames 17 are freely slidable on the longitudinal slide rods 15 and 16 but are biased toward the front of the harvester by springs 36 connected between the sleeves 18 and the forwardly displaced inner upright 10. With particular reference to FIG. 3, it will be seen that alternate frames 17 are staggered or offset longitudinally of the harvester, so that the vibratory fingers 9 of one frame are initially offset between the vertical planes of the adjacent fingers. This is accomplished by short spacer sleeves 37 and long spacer sleeves 38 on the slide rods 15. As the fingers 9 on each frame are advanced into the crop or bush being harvested, advancing motion of the harvester causes the frame to slide rearwardly on the tubes 15 and 16. When the fingers are retracted from the bush, the springs 36 return the frames to their foremost positions.

The mechanism for transversely advancing and retracting the supports 23 with the vibratory fingers thereon is shown in FIGS. 5 to 7 which show the several cylinders 31 and the associated hydraulic system. The pump 8 delivers to two valves 39 and 40, each associated with the cylinders on one side of the harvester. The valves are mechanically actuated between two opposite positions with a dwell period between motion to the two positions. A valve actuator including a speed reducer 41 is driven by a motor 42 to rotate the shaft 43 with cams 44 and 45 thereon at 90° spacing. A rock shaft 46 mounted on top of the speed reducer carries a pair of sleeves 47 each with a yoke 48 and 49 projecting rigidly therefrom. The yokes carry follower rolls 50 and 51 that are engaged by the rotating cams 44 and 45. Each yoke is connected as at 52 to the actuating plunger of one of the valves 39 or 40.

As the cam 44 engages roller 51 on yoke 48 to shift valve 39, cam 45 is leaving the yoke 49 and roller associated with valve 40. Valve 39 is shifted to admit pressure to conduit 53, and connect conduit 54 to the return to the pump. Left cylinders 31A, 31C, and 31E are accordingly retracted, and left cylinders 31B and 31D are advanced to correspondingly reciprocate the left vibrator fingers. The fingers remain in this position until the valve is reversed by 180° rotation of the cam 44 to follower 50, when the positions of the fingers on the left side of the machine are reversed.

Prior to reversal of position of the left fingers, cam 45 will engage its associated follower 50 to rock the yoke 49 and shift valve 40. This supplies pressure to conduit 55 and connects conduit 56 to the return line. The action results in cylinders 31F, 31H and 31K retracting, while cylinders 31G and 31J advance the fingers associated therewith.

By coordinating the speed of the motor 42 and gear reducer 41 to the ground speed of the harvester, the length of time that the fingers 9 will be projected into the bush can be coordinated with horizontal movement of the harvester. This time and distance of horizontal advance is less than the yieldable motion of the vibrating fingers permitted by the frames 17 on the slide rods 15 and 16. A desirable timing of the fingers is to arrange the speed of the cam shaft 43 so that valve 39 is actuated by cam 44 to advance the pistons of the cylinders 31B and 31D while the harvester is advancing about 5 inches on the ground. The fingers 31A, 31C and 31D retract during the same period. The fingers of the left side remain in these positions for about 180° of rotation of the shaft 43 which is equal to about 15 inches on the ground. In the meantime, the cam 45 which controls valve 40 will have engaged follower 50 and actuated the valve to advance the pistons of the cylinders 31F, 31H and 31K, while retracting the pistons of cylinders 31G and 31J. Since cams 44 and 45 are offset by 90°, there will be a period during each cycle when fingers from each side of the machine are advanced into operative engagement with the crop. The fingers that are in engagement with the crop from one side of the machine will retract prior to the fingers from the other side. As a result, the part of the crop or bush released by one group of fingers tends to move rearwardly and be engaged by the other group of fingers from the other side of the machine.

What I claim as new is:

1. In a harvesting machine adapted to straddle crop row and having plural vibrator fingers on each side engageable with opposite sides of the crop, the improvement which comprises, plural fingers supported at different levels on each side of the machine, plural sets of coacting longitudinal slides and cross-slides with each set supporting at least one of said fingers at each level on one side of the machine, springs biasing the longitudinal slides forwardly relative to the direction of longitudinal advancing motion of the machine, and power means connected to reciprocate the cross-slides transversely of the machine.

2. A machine as defined in claim 1 in which there are a pair of fingers arranged in longitudinally spaced and transversely extending relation on each set of slides, and a motor on each set of slides connected to rotate each finger in an orbital path.

3. A machine as defined in claim 1 or 2 in which said power means are individual connections to said cross-slides arranged to advance vertically alternate fingers into the crop, while retracting the other vertically spaced fingers.

4. A machine as defined in claim 3 in which the power means on opposite sides of the machine are actuated, one in delayed relation to the other.

5. A machine as defined in claim 4 in which the power means are hydraulic cylinders connected to advance and retract the vertically spaced fingers, and valve means connected to actuate said cylinders, the valve means associated with one side of the machine being actuated in 90° trailing relation to the valve means associated with the other side of the machine.

6. A machine as defined in claims 3 or 5 in which said power means, and the valve means thereof in claim 5, have structure providing finger-advancing and finger-retracting periods separated by a dwell period, and the time for each advancing motion and each retracting motion is equal to the time required to advance said machine about 5 inches on the ground.

7. A machine as defined in claims 3 or 4 in which a group of fingers is advanced into the crop at about every 7½ inches of travel of the machine.

8. A machine as defined in claim 1 in which said power means are driven in timed relation to the movement of said machine to advance and retract said fingers during movement of the machine along the ground which is less than the movement permitted by the longitudinal motion of said part of said cross-slides.